May 31, 1966 C. B. VAUGHAN 3,254,291
MULTIPLE INDEPENDENTLY VARIABLE D.C. POWER SUPPLY
Filed Jan. 15, 1962 4 Sheets-Sheet 3

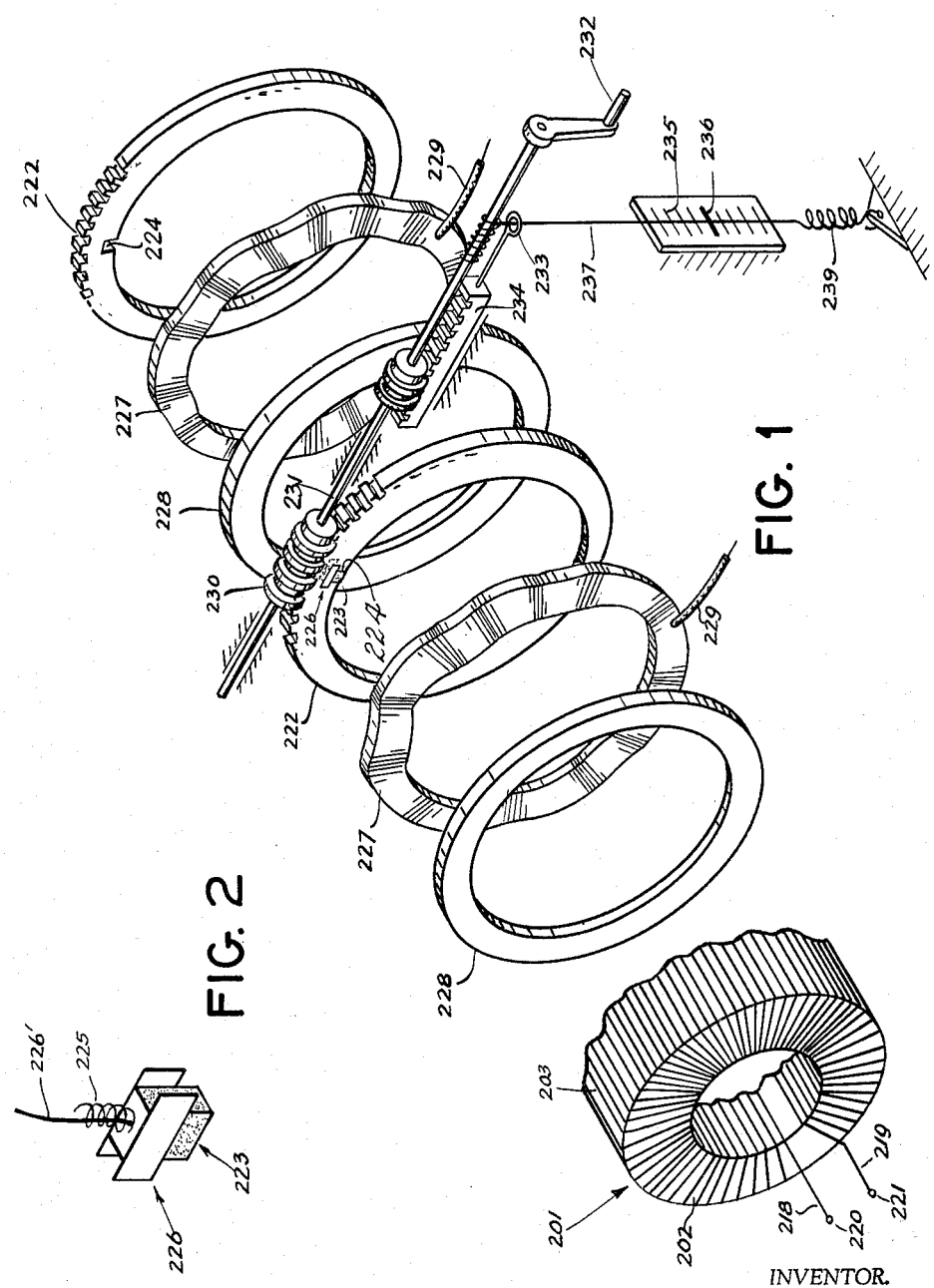

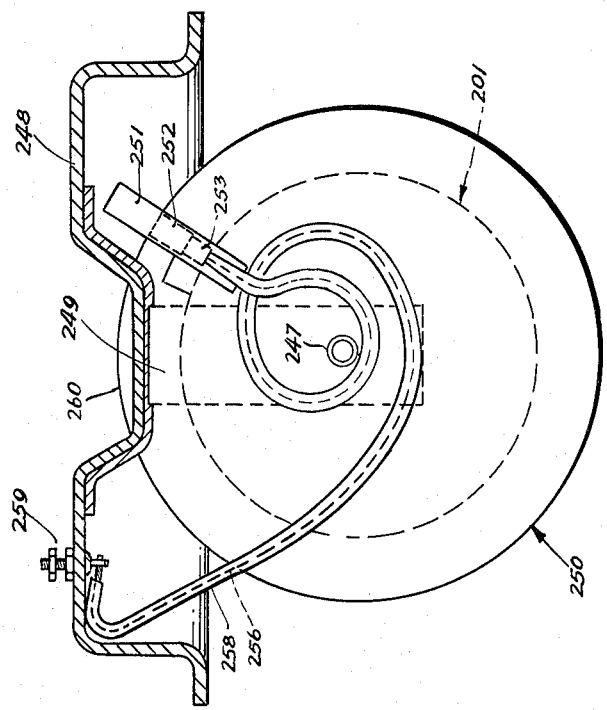
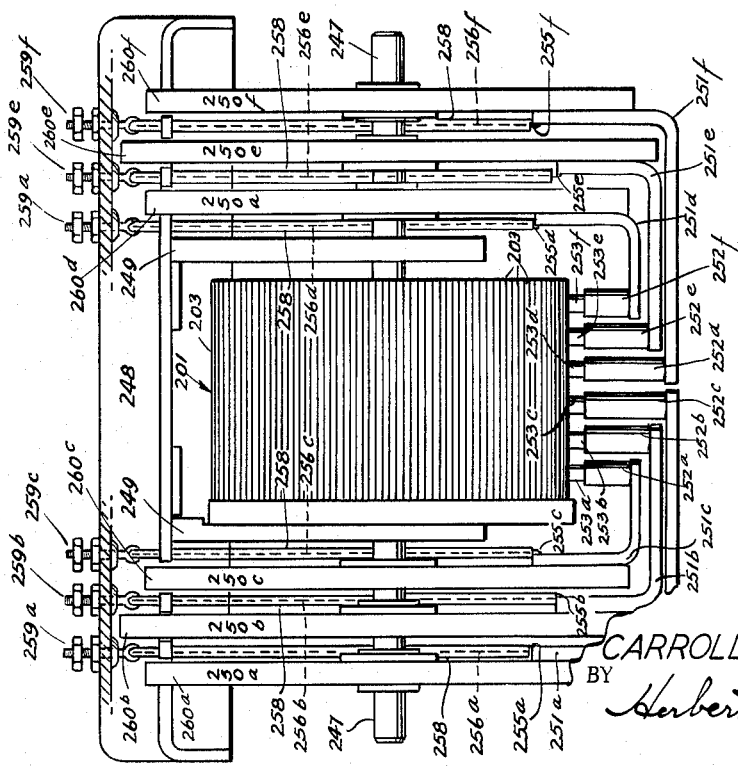

INVENTOR.
CARROLL B. VAUGHAN
BY
ATTORNEY

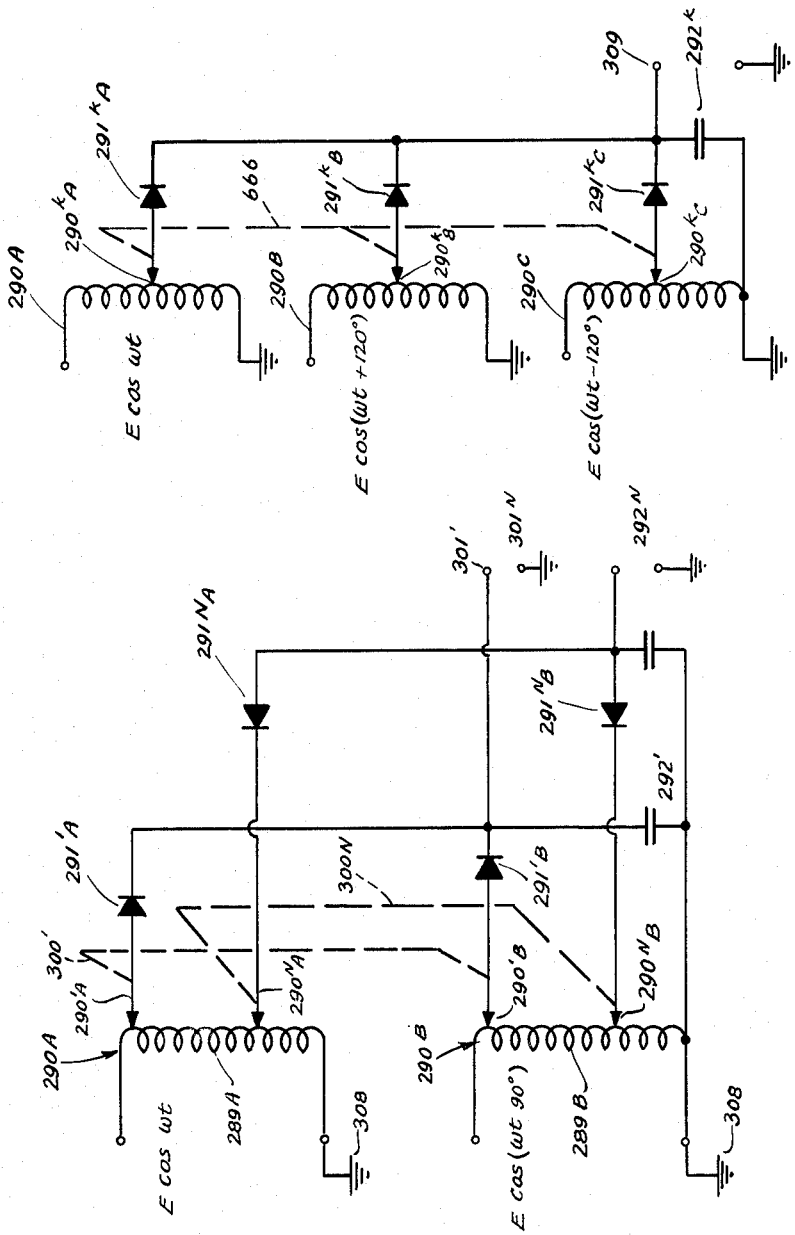

United States Patent Office 3,254,291
Patented May 31, 1966

3,254,291
MULTIPLE INDEPENDENTLY VARIABLE D.C.
POWER SUPPLY
Carroll B. Vaughan, East Orange, N.J., assignor to The Bendix Corporation, Teterboro, N.J., a corporation of Delaware
Filed Jan. 15, 1962, Ser. No. 166,224
11 Claims. (Cl. 321—27)

The present invention relates in general to a multiple independently variable direct current power supply and more particularly to a direct current multi channel power supply circuit, and to an alternating current multi channel power supply circuit using a multi tap auto transformer having a plurality of independently variable output terminals and which may be adapted for use as a variable direct current power supply in a test set for testing electrical apparatus such as disclosed and claimed in a copending U.S. application Serial No. 166,316, filed January 15, 1962, by Carroll B. Vaughan and assigned to The Bendix Corporation, assignee of the present invention.

Heretofore, a number of devices were available to supply from a single alternating current source, a plurality of independently adjustable alternating currents on a plurality of channels. These devices used a separate auto transformer for each output channel. Or, if there was a predetermined relationship between the alternating currents to be provided at two channels, a single auto transformer was used, with two brushes mechanically linked together.

The present invention is a multi independent brush auto transformer that provides a plurality of independently adjustable alternating currents on a plurility of channels with the use of only a single magnetic core and a single source of alternating current. Some of the advantages of the novel multi independent brush auto transformers are compactness, efficiency, and the ability to avoid saturation of the core when the output voltage is half wave rectified.

The ability to avoid saturation of the magnetic core is inherent to the multi tap auto transformers. Saturation occurs when the output of an auto transformer feeds a half wave load. However, the multi tap auto transformer can feed several half wave loads, one on each of its output terminals. The half wave loads can be adjusted so that the loads at some terminals will be of one polarity while the load at the other terminals will be of the other polarity, thus avoiding saturation of the magnetic core.

The present invention is also a direct current power supply circuit that includes the multi independent brush auto transformer. A plurality of rectifying circuits are attached one each, to each output channel of the multi independent brush auto transformer to rectify the alternating current output. Several of the rectifying circuits may include a reversing circuit, of a novel design, for reversing polarity of the direct voltage supplied at a particular channel without the introduction of the usual undesirable switching transient.

The direct current power supply may comprise a single multi variable auto transformer or several multi variable auto transformers, and a polyphase alternating current source, for improving the quality of the direct current output by a reduction of ripple. Moreover, the direct current power supply may comprise several transformers and/or auto transformers serially interconnected for isolation and improved resolution.

An object of the invention is in the provision of a novel multi channel power supply.

Another object of the invention is in the provision of a novel direct current power supply having several output channels, each output voltage being independently adjustable.

Another object of the invention is in the provision of a novel direct current power supply where the polarity of the output voltage can be reversed without switching transients.

Another object of the invention is in the provision of a novel direct current power supply circuit having high resolution.

Another object of the invention is in the provision of a novel direct current power supply circuit providing several independently adjustable direct current voltages of high quality.

Another object of the present invention is in the provision of a novel alternating current power supply having a multiplicity of output terminals; the voltage at each terminal being continuously adjustable and adjustable independently of each other.

Another object of the invention is in the provision of a novel alternating current power supply having a plurality of independently adjustable output voltages taken off a single core auto transformer.

Another object of the present invention is in the provision of a novel auto transformer having a plurality of independently adjustable output terminals to provide a compact alternating current power supply.

Another object of the invention is to provide a novel independent brush auto transformer having a plurality of output terminals to avoid saturation of the core during half wave loading of the outputs.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

FIGURE 1 is an exploded view of the operative parts of a multi variable brush auto transformer of the present invention.

FIGURE 2 is a detailed view of a spring loaded brush and brush holder of the multi variable brush auto transformer shown in FIGURE 1.

FIGURE 3 is a front view of the multi variable brush auto transformer.

FIGURE 4 is a side view of one of the single brush assemblies of FIGURE 3.

FIGURE 7 is a schematic drawing of a modified form of the novel direct current power supply circuit of FIGURE 5 incorporating two variable brush auto transformers.

FIGURE 8 is a schematic drawing of still another modified form of the power supply circuits of FIGURE 5 showing a polyphase power supply circuit incorporating three variable auto transformers.

Figure 5:
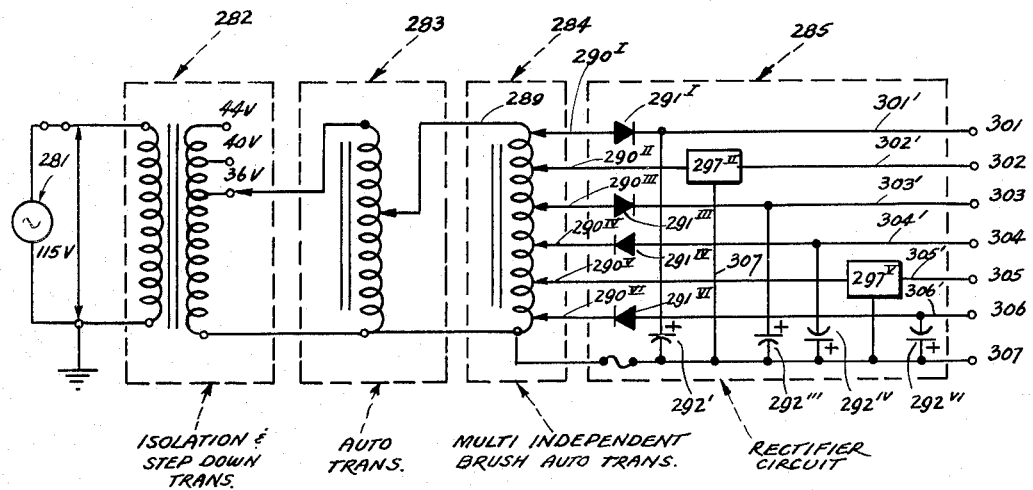
FIGURE 5 is a schematic drawing of a novel direct current power supply circuit incorporating a multi variable brush auto transformer such as shown in FIGURES 1 and 3.
Figure 6:
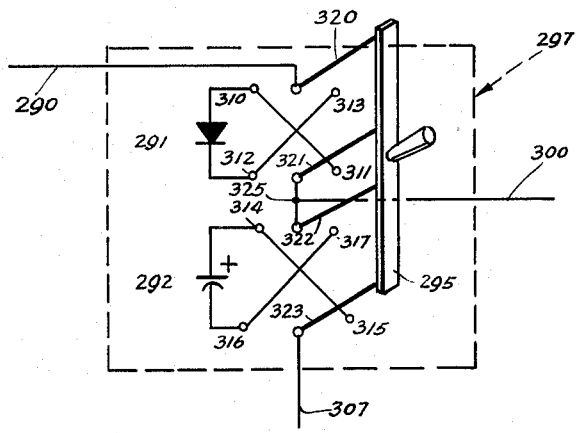
FIGURE 6 is a schematic drawing showing in detail a polarity reversal switch in the power supply circuit of FIGURE 5.

A novel direct current power supply is shown in the schematic drawings of FIGURES 5 and 6 and incorporates a novel multi independent brush auto transformer (or alternating current power supply) two embodiments of which are shown in FIGURES 1, 2, 3 and 4.

Referring to FIGURE 1, there is shown therein an exploded view of the operative parts of the novel multi independent brush auto transformer. In particular, a toroid 201 is wound with a wire 202 in a single layer over its outside cylindrical surface so as to provide an exposed segmental wire contact or commutator surface 203 of a wire wound toroid, as described and claimed in a copending U.S. application Serial No. 315,735, filed September 25, 1963 by Carroll B. Vaughan as a division of U.S. application Serial No. 166,343, filed January 15, 1962 by Carroll Byrd Vaughan, now U.S. Patent No. 3,213,520 granted October 26, 1965, to Carroll B. Vaughan for Method For Preparing A Toroid Core, and assigned to The Bendix Corporation, assignee of the present application. In the FIGURE 1, the wire is shown covering approximately 330° of the outside surface.

Two ends 218, 219, of the wire 202 to be connected to an alternating current source are brought out to two terminals 220 and 221 on a toroid frame (not shown). A ring gear 222 (having an inside diameter of, for example, approximately 3¼ inches, and an outside diameter of, for example, approximately 4½ inches with 10 teeth per inch on its outside diameter), fits over the toroid 201. The toroid 201 has an outside diameter of, for example, approximately 3 inches.

A brush 223, held by a brush holder 226, makes a variable operative electrical contact with commutator surface 203 and is mounted in a slot 224 located in the wall of the gear 222 and is capable of moving radially in the gear under the constraint of the slot 224, spring loading means 225, and the brush holder 226. A detailed view of the spring loading 225, brush 223, and brush holder 226 is shown in FIGURE 2. The brush 223 is, for example, approximately 5/16 by 1/16 by 5/16 of an inch, and the ring gear 222 has a width, for example of 1/16 of an inch. A flexible metal pigtail conductor 226' leads from the brush holder 226 to the metal ring gear 222. Thus, there is a conducting path from the input wire terminals 220 and 221, of the toroid 201 through the toroid windings 202 and commutator surface 203 to the brush 223, brush holder 226, and pigtail conductor 226' into the ring gear 222.

Ring gear 222 rides next to a wrinkle spring washer 227 made of a conducting material. A pigtail conductor 229 is soldered to the wrinkle washer 227 and brought out to a terminal lug (not shown) on the frame (not shown). An insulating ring washer 228 having the same dimension as the ring gear 222 is then stacked next to the wrinkle spring washer 227.

What has just been described, namely the ring gear 222 brush 223, wrinkle washer 227, and insulating ring 228 comprise one of many assemblies which are to be mounted in the multi independent brush auto transformer. In the present embodiment, 10 such assemblies are installed around the center toroid 201. It should be noted that the multiple brush auto transformer may comprise any number of outputs, depending on the length of the toroid 201 and the number of assemblies.

The toroid 201 is securely mounted on a rigid frame (not shown) and surrounded by a housing (not shown). The wire 202 on the toroid 201 is connected at its ends 218 and 219 to two terminals 220 and 221 mounted on the outside of the frame and housing.

The brushes 223 are positioned by rotation of the ring gear 222. This gear 222 is rotated by means of a worm gear 230 mounted on a shaft 231 terminating in a crank 232. By revolving the crank 232, the worm gear 230 causes the ring gear 222 to rotate.

The location of the brush 223 on the toroid commutator surface 203 is proportional to the number of revolutions of the crank 232 and is indicated on a flat slide rule indicator 235. A string 237 winds and unwinds with the direction of rotation of the crank 232. The string is led over small pulley and actuates pointer 236 on the slide rule indicator 235. A spring 239 or other restoring force returns the pointer 236 to the zero position when the brush is at a minimum position. As the crank 232 is turned, a rack and pinion arrangement advances a slotted shaft 234 with an eyelet 233 to guide the string 237, in order that the string will not slack up on the crank shaft 232, but will lay in even turns. There may be a plurality of such gear and brush assemblies, and there is one indicating device for each gear and brush assembly and each slide rule indicator 235 may be calibrated in either percentages or proportional to the output voltage.

ALTERNATIVE EMBODIMENT

FIGURE 3 shows a front view of an alternative embodiment of the multi independent brush auto transformer. FIGURE 4 shows a side view of a typical assembly of the transformer of FIGURE 3. The toroid 201 is rigidly mounted on a shaft 247 which is mounted on a frame 248 by two brackets 249. Six adjustors comprising six knurled wheels 250a through 250f are rotatably mounted on the shaft 247 and coaxial with the toroid 201. Six arms, 251a through 251f of conducting material are securely mounted one each to the knurled wheels 250a through 250f, and are so spaced that the arms can pass each other freely. Six brush holder assemblies 252a through 252f are mounted at the ends of arms 251a through 251f and each contains a brush 253a through 253f. Each brush 253a through 253f makes an operative electrical contact with a wire commutator surface 203 (or segmental surfaces of the wire winding) of the toroid 201, with each brush making contact along a different path or track on the wire wound commutator surface 203. The wire wound surface 203 may be, for example, of a commutator type.

Six electrical conductors 255a through 255f connect each conducting arm 251a through 251f to six hair springs 256a through 256f, made of conducting material. Each spring is made of, for example, Phosphor bronze ribbon and is enclosed in a spaghetti sleeving 258, as shown in FIGURES 3 and 4. The enclosed springs 256a through 256f are coiled around the shaft 247 next to the associated wheel 250a through 250f to form a one and one quarter turn loop around the shaft when the brush 253 is rotated to, for example, a three hundred and thirty degree position; and a half open turn when the brush is in a zero degree position. The purpose of the phosphor ribbon conductor is twofold: first, to mechanically standup under constant coiling and uncoiling, caused by the wheel 250 turning in adjustment of the output voltage; and second, to be a conductor from the brush 253 (in contact with the contact surface 203) to terminal 259 on the frame; that will not interfere with the independent motion of the wheels 250.

The other end of each spring ribbon 256a through 256f is connected to terminals 259a through 259f on the frame 248. Thus, a multi tap independently variable auto transformer is constructed. The number of independent variable taps will depend on the width of the toroid 201 and the number of knurled wheels 250 with attached arm 253 and brush 257.

Each of the knurled wheels 250a through 250f may bear suitable indicia 260a through 260f, respectively, to indicate the relative position of each brush 253 with respect to the wire wound commutator surface 203 and from, for example, the zero degree position to the three hundred and thirty degree position.

The novel autotransformers heretofore described with reference to FIGURES 1, 2, 3 and 4 are described and claimed in a U.S. application Serial No. 300,312, filed August 6, 1963, by Carroll B. Vaughan, as a division of the present application and assigned to The Bendix Corporation.

D.C. POWER SUPPLY CIRCUIT

Referring to FIGURE 5, there is shown therein a schematic drawing of a novel power supply circuit using the multi variable independent brush auto transformer of, for example, the type shown in FIGURES 1 and 2 or FIGURES 3 and 4. Referring to FIGURE 5, and tracing the structure and operation of the power supply simultaneously, an electrical potential 281 which may be the 115 volt A.C. commonly available, is applied across the input of an isolation and step down transformer 282 which reduces the line voltage to, for example, 36 volts. This output is fed to a conventional auto transformer 283 which in turn feeds current into a multi variable tap auto transformer 284 shown as including a winding 289 and six variable output terminals $290^I$ through $290^{VI}$. The adjustable output terminals $290^I$ through $290^{VI}$ are connected into a rectifier circuit 285, which rectifies the output of the auto transformer 284 to produce six adjustable D.C. voltages available at terminals 301 through 307. In particular, there is adjustable positive direct voltages, for example, of 0 to +50 volts D.C. on taps 301 and 303; and direct negative voltage, for example, of 0 to −50 volts D.C. on taps 304 and 306; and continuously positive and negative adjustable voltages, for example, of −50 to +50 D.C. volts on taps 302 and 305. The amplitude control for each of the voltages available on taps 301 to 306 is the adjuster on the multi variable auto transformer (the crank handle 232 of FIGURE 1 or knurled wheel 250 of FIGURES 3 and 4.)

The output at the first terminal $290^I$ of the multi variable tap transformer 284 is fed into a forward biased diode $291^I$ and then across an electrolytic capacitor $292^I$ whose negative side is connected to common. An output terminal 301 of the power supply is connected by a conductor 301' to the juncture of the diode $291^I$ and the electrolytic capacitor $292^I$. Thus, an A.C. voltage from the multi tap auto transformer is adjusted in amplitude by the multi tap auto transformer 284 and then rectified in the rectifier circuit 285.

The voltage at terminal 303 is rectified by a circuit identical to the one just described; and the voltage at taps 304 and 306 are rectified by the same circuit with the exception that diodes $291^{IV}$ and $291^{VI}$ and the capacitors $292^{IV}$ and $292^{VI}$ are of reversed polarity.

In order to supply continuously variable ±50 volt D.C. voltage on taps 302 and 305, a switching circuit $297^{II}$ and $297^V$ is applied comprising a four pole double throw switch 295, and shown in detail in FIGURE 6. The switch 295 includes four pairs of connected contacts 310 and 311, 312 and 313, 314 and 315, 316 and 317, and which pairs of contacts are arranged to cooperate respectively with four switch arms 320, 321, 322, and 323 of the four pole double throw switch 295. A diode 291 is connected in the forward direction across contacts 310 and 312 while a capacitor 292 is connected across contacts 314 and 316. An output voltage from the multi tap auto transformer 284 is applied through conductor 290 ($290^{II}$ or $290^{IV}$ of FIGURE 5) to the switch arm 320 of the switch 295; while the switch arms 321 and 322 are connected by a conductor 325 to an output conductor 300 (302' or 305' of FIGURE 5), and contact 323 is connected to common conductor 307. Thus, as shown in FIGURE 5, the terminals 302 and 305 are connected via conductors 302' and 305', respectively, to the switch arms 321 and 322 of the receiving switch 295 of FIGURE 6 included in the respective switching circuits $297^{II}$ and $297^{IV}$ of FIGURE 5.

The novel polarity reversible rectifying circuit described with reference to FIGURES 5 and 6 is described and claimed in a copending U.S. application Serial No. 300,-317, filed August 6, 1963, by Carroll B. Vaughan, as a division of the present application and assigned to The Bendix Corporation.

When the four pole double throw switch 295 is closed in one direction, current from the multi variable tap auto transformer 284 flows in the positive direction across diode 291 and is stored across capacitor 292. When the switch 295 is thrown in the opposite direction, the diode 291 is back biased and the capacitor 292 is reversed thus applying through conductors 325 and 300 (conductors 302' and 305' of FIGURE 5) a negative D.C. voltage to the output terminal 302 or 305. It should be noted that upon operation of this switch 295, there is an immediate reversal of polarity seen at the output terminal 302 or 305 and there is no surge transient, because the capacitor 292 does not discharge, and therefore does not have to be recharged. The diode 291 will effectively control and cause the charge on the capacitor 291 to remain in the same sense irrespective of the position of the reversing switch 295. Reversal of position of the switch 295 will, however, reverse the polarity seen at the output terminals 302 or 305.

Thus, the adjustable A.C. voltages available at terminal $290^{II}$ and $290^V$ from the multi tap transformer 284 are fed into the two circuits $297^{II}$ and $297^V$ which are similar to the circuit shown in FIGURE 6. The voltages are rectified and supplied through conductor 302' and 305' to terminals 302 and 305 as a continuously variable +50 to −50 D.C. voltage.

In addition to supplying a plurality of adjustable voltages, the power supply circuit supplies output voltages having a high resolution and great flexibility of range because the stepdown transformer 282 and the conventional auto transformer 283 can be adjusted, thereby the range output D.C. voltage available can be made large or small.

A further advantage of the D.C. power supply circuit as shown is that it avoids saturating the magnetic core of the multi independent brush auto transformer 284. Each rectifier circuit, (diode 291 and capacitor 292) presents a half wave load to the multi tap auto transformer 284, however, some of the half wave loads (those on terminals $290^I$ and $290^{II}$ of the transformer 284) are of one polarity, while loads on the terminals $290^{IV}$ and $290^{VI}$ are of a reversed polarity. Thus, saturation of the magnetic core of the transformer 284 may be avoided.

TWO PHASE D.C. POWER SUPPLY CIRCUIT

The quality of the D.C. voltage output of the power supply circuit and, in particular, the ripple on the D.C. voltage can be improved by providing two or three or more multi variable tap auto transformers of the structure shown by FIGURES 1 or 3 as operatively connected together as shown in the schematic drawings of FIGURES 7 and 8. In FIGURE 7 two multi variable tap auto transformers 290A and 290B may be of the structure shown by FIGURES 1 or 3 and may have windings 289A and 289B respectively connected together to a common potential 308; and further the corresponding output terminals thereof may be mechanically linked together. In the aforenoted arrangement a voltage $E \cos \omega t$ is applied to winding 289A of one independent brush auto transformer 290A and a second voltage $E \cos(\omega t + 90°)$ ninety degrees out of phase with the first voltage is applied to the winding 289B of the second multi brush auto transformer 290B. The amplitude E of the voltages applied to each auto transformer 290A and 290B is equal.

A plurality of adjustable output taps on each auto transformer is shown bearing legends 290'A through $290^nB$. Corresponding pairs of adjustable output taps (e.g. $290'A$–$290^nA$ with $290'B$–$290^nB$ respectively) are mechanically linked together by mechanical linkages 300' through $300^n$ so that movement of an arm on one transformer 290A moves the corresponding arm on the other transformer 290B. The arms are so positioned that the voltage applied at one arm of a pair is equal in magnitude but 90° out of phase with the voltage at the other arm of the pair.

The voltage available at each tap is fed through a diode designated generally by legend 291, and in particular, the legend 291 is superscribed and postscribed according to the position of the diode in the power supply circuit. The diodes (e.g. 291'A and 291'B) associated with a particular pair of corresponding mechanically linked adjustable terminals (e.g. 290'A and 290'B) are always of the same polarity. Each pair of diodes is connected to a common capacitor designated generally by legend 292 and subscribed to indicate the position of the particular capacitor in the circuit, the superscript on the capacitor corresponding to the superscript on the taps and diodes. Each capacitor in combination with its associated pair of diodes forms a rectifying circuit with a D.C. voltage output available at the juncture of the diodes and the capacitors. Each capacitor $292^I$ through $292^{IV}$ is charged during each half cycle of alternating supply voltage by the two auto transformers 290A and 290B, and thus the ripple seen on a load is smaller than with a single auto transformer and the frequency of the ripple is twice that of the ripple where only a single auto transformer is used.

POLYPHASE D.C. POWER SUPPLY CIRCUIT

A similar arrangement shown in FIGURE 8 may be used for a three phase line. In the last-mentioned arrangement three identical multi variable tap auto transformers 290A, 290B, and 290C of a type such as shown in FIGURES 1 or 3 are so arranged that each received the same amplitude of alternating voltage. However, the voltage applied to each of the three auto transformers 290A, 290B, and 290C is 120° out of phase with regard to the voltage applied to each other auto transformer. Corresponding wiper arms $290^kA$, $290^kB$, $290^kC$, (where the superscript $k$ designates any channel of the power supply) are mechanically connected together by linkage 666 so that linked arms move in equal amounts on each auto transformer. Each wiper arm is connected through a diode $291^kA$, $291^kB$, $291^kC$ to a common capacitor $292^k$ so that the capacitor $292^k$ is charged three times in each cycle of alternating voltage, and the output voltage available across the capacitor at terminal 309 has a ripple of reduced amplitude and of higher repetition rate.

The present invention is directed to the novel power supply circuits described and claimed herein with reference to FIGURES 5, 6, 7 and 8.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A power supply circuit comprising a magnetic core auto transformer having an input and a plurality of output taps, a source of alternating potential applied to the input of the auto transformer, a plurality of rectifying circuits connected at each output with substantially one half of the plurality of rectifying circuits producing a direct current voltage of a positive polarity and the balance of the rectifying circuits producing a direct current voltage of a negative polarity whereby saturation of the magnetic core may be avoided.

2. A power supply circuit comprising a magnetic core multi independent brush auto transformer having an input and a plurality of output taps, a source of alternating potential applied to the input of the auto transformer, a plurality of rectifying circuits of the peak rectifying type connected at each output with substantially one half of the plurality of rectifying circuits producing a direct current voltage of positive polarity and the balance of the rectifying circuits producing a direct current voltage of negative polarity whereby saturation of the magnetic core may be avoided.

3. A power supply circuit comprising two magnetic core multi tap auto transformers each having an input, a plurality of moveable output taps, and with corresponding taps on each auto transformer mechanically interconnected so that movement of a tap on one auto transformer moves the corresponding tap on the other auto transformer; a plurality of rectifying circuits each including a pair of diodes connected in parallel, and with both diodes of the pair biased in the same sense, one diode of each pair connected to a movable output tap of one auto transformer, and the other diode of the pair connected to the corresponding output tap of the other auto transformer, a capacitor connected in series with the parallel combination of diodes, and substantially one half of the plurality of rectifying circuits producing a direct current voltage of positve polarity and the balance of the plurality of rectifying circuits producing a direct current voltage of negative polarity whereby saturation of the auto transformer may be avoided; a source of alternating potential applied to the input of one auto transformer, and another source of alternating potential applied to the input of the other auto transformer, and the sources of alternating potential being of equal magnitude and of opposite polarity.

4. A direct current power supply comprising a common alternating current source, first and second output means arranged in parallel with said source, a first output current rectifier means arranged in an output conductor of said first output means to connect said source thereto, said first rectifier means forming a series conduction path permitting current flow during one alternate period of said source in one direction through said first output means and preventing current flow in an opposite direction during the other alternate period, a second current rectifier means arranged in an output conductor of said second output means to connect said source thereto, said second rectifier means forming a series conduction path with said second output means permitting reverse polarity current flow during said other alternate period of said source in one direction through said second output means and preventing current flow in the opposite direction during said one alternate period, and said first and second current rectifier means being so connected to said source that said first and second parallel output means are substantially isolated from each other.

5. The combination defined by claim 4 wherein said common alternating current source comprises one common transformer secondary winding.

6. The combination defined by claim 4 including capactive means connected in parallel across each of said first and second output means, said capacitive means developing an average reverse voltage limiting conduction through said first and second output means of periods wherein said alternating source excceds said average voltage.

7. The combination defined by claim 4 wherein at least one of said first and second output means includes a reversible rectifier and capacitor switch means operative to effect an immediate reversal of polarity in a current flow through said one output means.

8. The combination defined by claim 5 wherein said transformer winding comprises tap connection means permitting selection fo the voltage supplied to said first and second output means.

9. The combination defined by claim 5 including variable contact means on said secondary winding permitting the connection of a plurality of output means and selection of the voltage supplied to said output means.

10. The combination defined by claim 8 wherein said tap means permits connection of a plurality of rectifier means and output means to said transformer winding.

11. The combination defined by claim 9 including a first variable contact means connected to a third output means, a third current rectifier means being connected between said first variable contact means and said third output means permitting conduction in the same direction as the first rectifier means, a second variable contact means connected to a fourth output means, a fourth current rectifier means connected between said second variable contact means and said fourth output means to permit conduction in the same direction as said second rectifier means.

References Cited by the Examiner
UNITED STATES PATENTS

| | | | |
|---|---|---|---|
| 1,901,636 | 7/1930 | Early | 323—43.5 |
| 2,192,050 | 2/1940 | Norcross | 323—43.5 |
| 2,201,642 | 5/1940 | Bauer | 323—45 X |

(Other references on following page)

UNITED STATES PATENTS

| | | | |
|---|---|---|---|
| 2,361,384 | 10/1944 | Davis | 323—43.5 |
| 2,727,205 | 12/1955 | Annis | 323—43.5 |
| 2,742,580 | 4/1956 | Holdt | 307—82 |
| 2,800,621 | 7/1957 | Carlson et al. | 321—8 |
| 2,859,398 | 11/1958 | Johnson et al. | 321—27 X |
| 2,949,592 | 8/1960 | Smiley | 336—148 |
| 2,985,857 | 5/1961 | Ellin et al. | 336—148 |
| 3,041,563 | 6/1962 | Carlsen | 336—149 |
| 3,053,991 | 9/1962 | Sturman | 307—82 |
| 3,054,943 | 9/1962 | Kettler | 323—43.5 |
| 3,059,164 | 10/1962 | Johnson | 321—8 |
| 3,060,320 | 10/1962 | Wiley | 307—82 |
| 3,089,074 | 5/1963 | Vaughan | 321—8 |
| 3,145,305 | 8/1964 | Levy | 307—82 X |

LLOYD McCOLLUM, *Primary Examiner.*

J. C. SQUILLARO, L. R. CASSETT, *Assistant Examiners.*